(12) United States Patent
Takahashi

(10) Patent No.: US 10,236,721 B2
(45) Date of Patent: Mar. 19, 2019

(54) POWER RECEPTION APPARATUS, DETERMINATION METHOD, AND PROGRAM

(71) Applicant: CANON KABUSHIKI KAISHA, Tokyo (JP)

(72) Inventor: Naoto Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 15/215,436

(22) Filed: Jul. 20, 2016

(65) Prior Publication Data

US 2017/0033613 A1 Feb. 2, 2017

(30) Foreign Application Priority Data

Jul. 27, 2015 (JP) ................... 2015-148143

(51) Int. Cl.
*H01F 27/42* (2006.01)
*H02J 50/12* (2016.01)
*H02J 50/60* (2016.01)
*H02J 50/20* (2016.01)
*H02J 50/30* (2016.01)
(Continued)

(52) U.S. Cl.
CPC .............. *H02J 50/12* (2016.02); *H02J 7/025* (2013.01); *H02J 50/20* (2016.02); *H02J 50/30* (2016.02); *H02J 50/60* (2016.02); *H02J 50/10* (2016.02)

(58) Field of Classification Search
CPC .. H02J 50/12; H02J 7/025; H02J 50/20; H02J 50/30; H02J 50/10; H02J 50/60
See application file for complete search history.

(56) References Cited

U.S. PATENT DOCUMENTS

2012/0200151 A1* 8/2012 Obayashi .............. B60L 11/123
307/9.1
2014/0062395 A1* 3/2014 Kwon ..................... H02J 50/60
320/108
(Continued)

FOREIGN PATENT DOCUMENTS

EP 2685583 A2 1/2014
JP 2010-220418 A 9/2010
(Continued)

*Primary Examiner* — Jared Fureman
*Assistant Examiner* — Duc M Pham
(74) *Attorney, Agent, or Firm* — Canon U.S.A., Inc. IP Division

(57) ABSTRACT

A power reception apparatus includes a power reception unit configured to receive power wirelessly supplied from a power transmission apparatus, a voltage conversion unit configured to convert the voltage of the power receive by the power reception unit to a voltage with a particular value, a load unit configured to operate with an output from the voltage conversion unit, a first detection unit configured to detect a voltage or a current input to the voltage conversion unit, and a second detection unit configured to detect consumption power of the load unit, a determination unit configured to make a determination, based on a result of a detection performed by the first detection unit and a result of a detection performed by the second detection unit, as to whether there exists a foreign object, which is not a target object to which power is to be transmitted, in a power transmission service area covered by the power transmission apparatus.

18 Claims, 3 Drawing Sheets

(51) Int. Cl.
 *H02J 7/02* (2016.01)
 *H02J 50/10* (2016.01)

(56) References Cited

U.S. PATENT DOCUMENTS

2014/0239735 A1* 8/2014 Abe .................. H02J 50/10
                                              307/104
2015/0142348 A1  5/2015 Huang et al.
2017/0229924 A1* 8/2017 Yoda ................. H02J 50/12

FOREIGN PATENT DOCUMENTS

| JP | 2012-170194 A | 9/2012 |
| JP | 2014-225963 A | 12/2014 |
| JP | 2015-006068 A | 1/2015 |

* cited by examiner

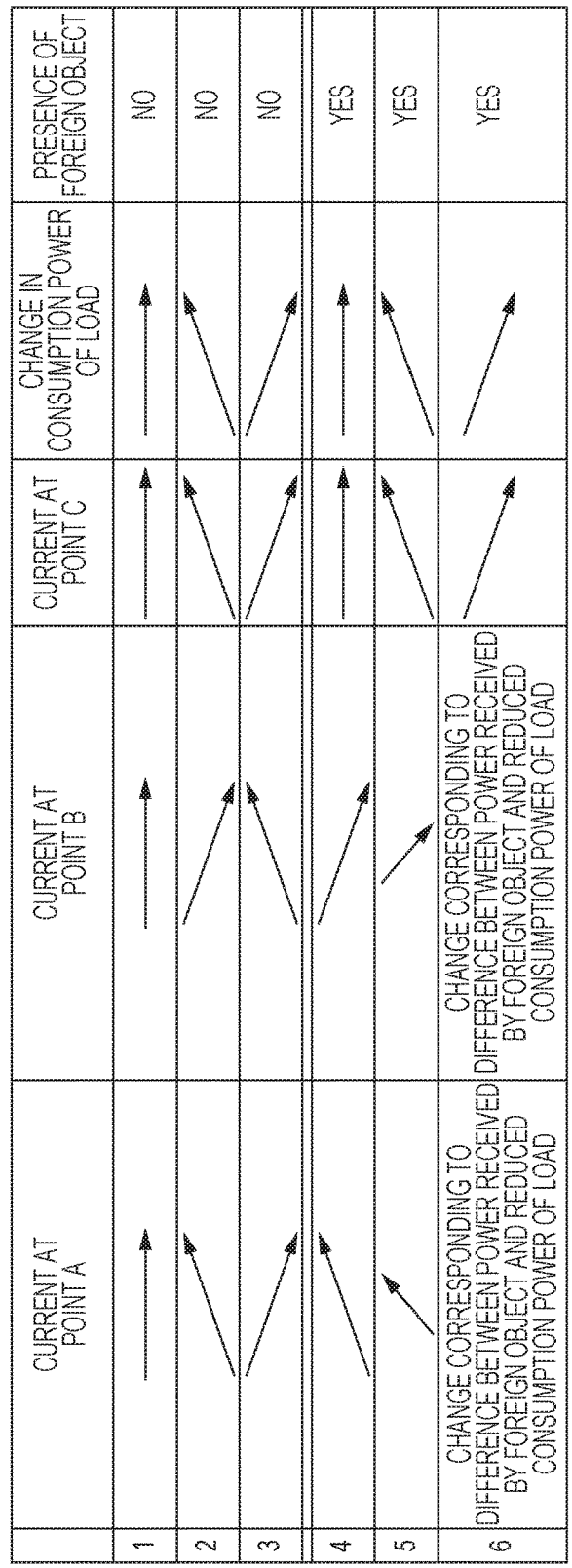

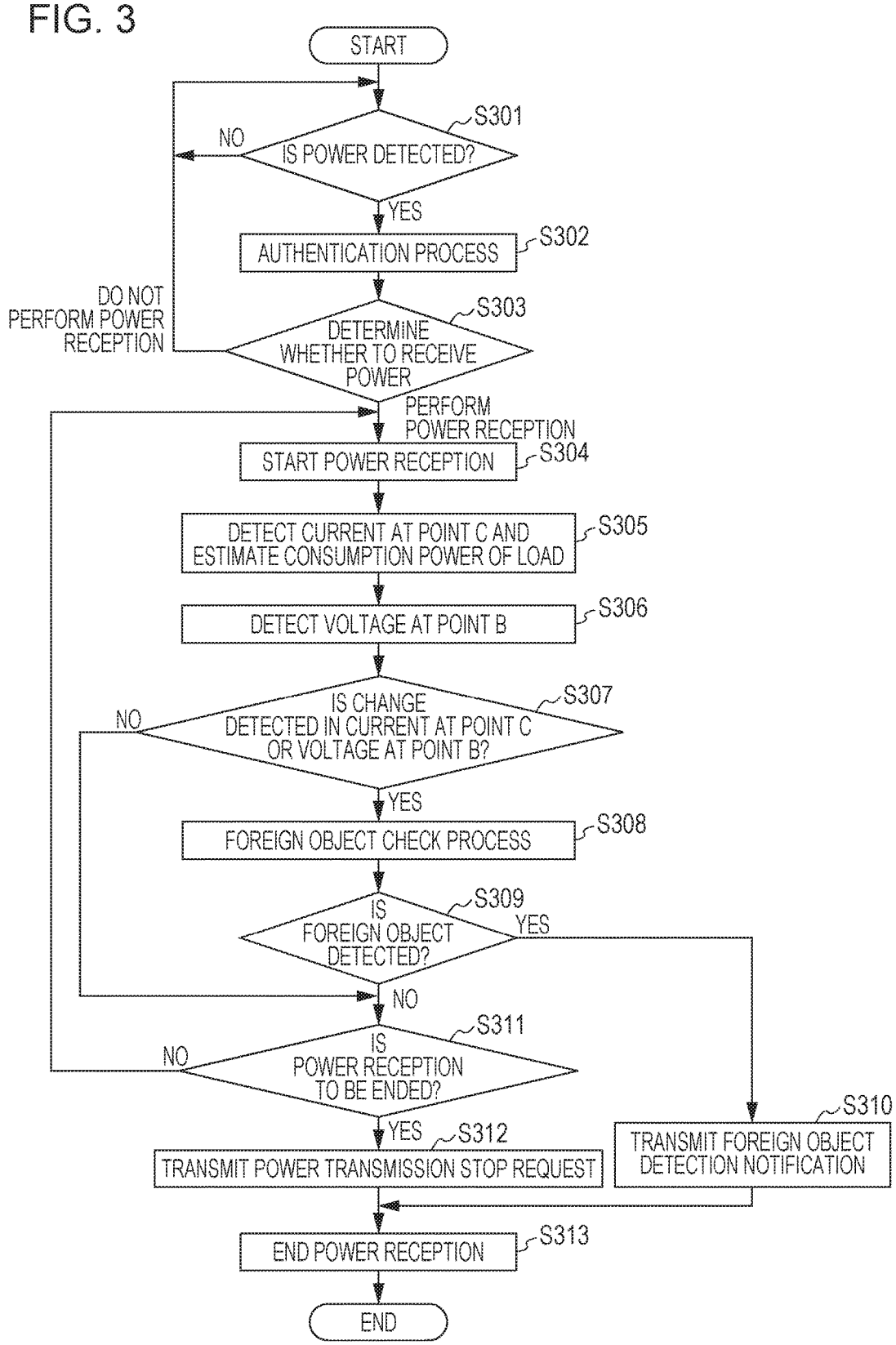

POWER RECEPTION APPARATUS, DETERMINATION METHOD, AND PROGRAM

BACKGROUND OF THE INVENTION

Field of the Invention

The present disclosure relates to wireless power transmission.

Description of the Related Art

Conventionally, a wireless power transmission system has been known which includes a power transmission apparatus configured to wirelessly transmit power and a power reception apparatus configured to receive the power supplied from the power transmission apparatus. In the wireless power transmission system, when an object exists within a power transmission service area covered by the power transmission apparatus, the object is influenced by an electromagnetic wave which is output, to supply power, by the power transmission apparatus. In the wireless power transmission system, therefore, it is necessary to detect an object that does not have a power reception function and that exists in the power transmission service area covered by the power transmission apparatus (hereinafter such an object will be referred to as a foreign object). Japanese Patent Laid-Open No. 2010-220418 discloses a technique in which a power reception apparatus makes a comparison between the magnitude of a current flowing through a transmission antenna represented by information received from the power transmission apparatus and the magnitude of a current flowing through a battery when the battery is charged using received power. When the ratio of the magnitude of the current flowing through the battery to the magnitude of the current flowing through the transmission antenna is smaller than a particular value determined based on a particular energy conversion efficiency, the power reception apparatus determines that there is a foreign object.

In the technique disclosed in Japanese Patent Laid-Open No. 2010-220418, the foreign object detection is realized by comparing the magnitude of the current flowing through the transmission antenna and the magnitude of the current flowing through the battery being charged with the received power. However, in the technique disclosed in Japanese Patent Laid-Open No. 2010-220418, there is a possibility that it is difficult to correctly detect a foreign object in a situation in which a change occurs in consumption power of a load that consumes received power. For example, in a case where a motor is a load that consumes received power and the rotation speed of the motor varies, when the rotation speed of the motor is reduced, the consumption power of the motor decreases, and thus the current flowing through the motor decreases. In the technique disclosed in Japanese Patent Laid-Open No. 2010-220418, when a reduction occurs in the current flowing through the load consuming the received power, there is a possibility that it is determined incorrectly that there is a foreign object in a situation in which there is actually no foreign object in the power transmission service area.

As described above, in the technique disclosed in Japanese Patent Laid-Open No. 2010-220418, when consumption power of a load changes, it is difficult to distinguish whether the change in the current is caused by the change in the consumption power of the load or existence of a foreign object, and thus there is a possibility that it is difficult to correctly determine whether there is a foreign object in the power transmission service area.

SUMMARY OF THE INVENTION

In an aspect of the present disclosure, a power reception apparatus includes a power reception unit configured to receive power wirelessly supplied from a power transmission apparatus, a voltage conversion unit configured to convert the voltage of the power received by the power reception unit to a voltage with a particular value, a load unit configured to operate with an output from the voltage conversion unit, a first detection unit configured to detect a voltage or a current input to the voltage conversion unit, a second detection unit configured to detect consumption power of the load unit, and a determination unit configured to make a determination, based on a result of a detection performed by the first detection unit and a result of a detection performed by the second detection unit, as to whether there exists a foreign object, which is not a target object to which power is to be transmitted, in a power transmission service area covered by the power transmission apparatus.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 2 is a diagram illustrating a relationship between a change in consumption power of a load and a change in current or voltage at points A, B, and C.

FIG. 3 is a flow chart illustrating an operation of a power reception apparatus.

DESCRIPTION OF THE EMBODIMENTS

Figure 1:
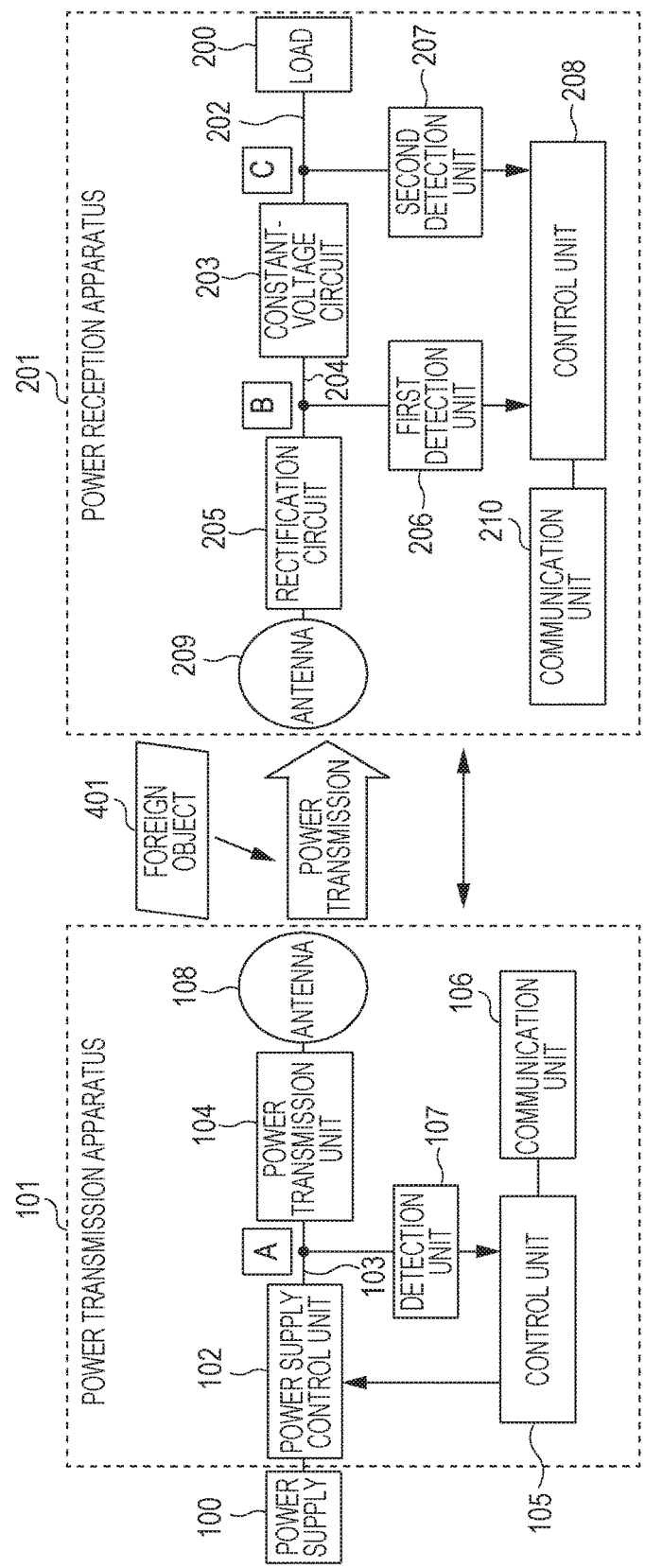
FIG. 1 is a diagram illustrating a configuration of a wireless power transmission system.

In an embodiment, even in a situation in which a change occurs in consumption power of a load that consumes received power, a determination is performed as to whether there is a foreign object, which is not a target object to which power is to be transmitted, in a power transmission service area. FIG. 1 illustrates a wireless power transmission system according to the present embodiment. Note that in the wireless power transmission system according to the present embodiment, it is assumed by way of example that wireless power transmission is preformed using a magnetic resonance method. In the magnetic resonance method, power is transmitted using magnetic resonance coupling between a resonator (a resonance element) of a power transmission apparatus and a resonator (a resonance element) of a power reception apparatus. However, the wireless power transmission method (the contactless power transmission method) is not limited to the magnetic resonance method, but other methods such as an electromagnetic induction method, an electrical resonance method, a microwave power transmission method, a laser power transmission method, and the like may be used.

In FIG. 1, the wireless power transmission system includes a power transmission apparatus 101 and a power reception apparatus 201. The power transmission apparatus 101 is a power transmission apparatus configured to wirelessly transmit power. The power reception apparatus 201 is a power reception apparatus having a power reception function to receive power supplied wirelessly from the power transmission apparatus 101 and processing the received power. In the wireless power transmission system according to the present embodiment, communication for authentication is performed between the power transmission apparatus and the power reception apparatus, and control information for controlling wireless power transmission is transmitted between the power transmission apparatus and the power reception apparatus. Hereinafter, the transfer of power between apparatuses will be referred to as power transmission, power reception, or wireless power transmission, and transmission of information for authentication or transmission of control information between apparatuses will be referred to simply as communication (wireless communication).

The power transmission apparatus 101 may be configured as follows. The power transmission apparatus 101 includes a power control unit 102, a power transmission unit 104, a control unit 105, a communication unit 106, a detection unit 107 and a transmission antenna 108. The control unit 105 controls the power transmission apparatus 101. The control unit 105 may be, for example, a central processing unit (CPU) including a memory such as a ROM, a RAM, and/or the like. The control unit 105 controls the whole apparatus by executing a control program stored in the memory. The power control unit 102 controls power that is input from a power supply 100, which may be a commercial power supply or a battery, and that is supplied to the power transmission unit 104 via a supply line 103.

The power transmission unit 104 converts DC or AC power input from the power control unit 102 to AC power with a transmission band frequency and generates an electromagnetic wave to be received by the power reception apparatus via a transmission antenna 108. The power transmission unit 104 adjusts the strength of the electromagnetic wave output from the transmission antenna 108. The adjustment of the strength is performed by adjusting a voltage (transmission voltage) input to the transmission antenna 108. Increasing the transmission voltage results in an increase in strength of the electromagnetic wave. The power transmission unit 104 also performs control to stop the power transmission from the transmission antenna 108 under the control of the control unit 105.

The detection unit 107 detects a voltage or a current of the supply line 103 (denoted by A in FIG. 1). The voltage or the current detected by the detection unit 107 is read out by the control unit 105. Alternatively, the detection unit 107 may detect a voltage or a current of the transmission antenna 108.

The communication unit 106 communicates with the power reception apparatus 201. The communication performed by the communication unit 106 is according to the Bluetooth (registered trademark) 4.0 standard. The Bluetooth (registered trademark) 4.0 defines a communication method called Bluetooth (registered trademark) Low Energy (BLE) that allows communication with relatively low consumption power. The communication unit 106 includes a chip for controlling wireless communication according to BLE and an antenna for transmitting a signal. Although it is assumed by way of example that the communication between the power transmission apparatus 101 and the power reception apparatus 201 is performed according to BLE, other communication standards may be used. For example, a wireless LAN (IEEE (The Institute of Electrical and Electronics Engineers, Inc) 802.11 series) may be used. Alternatively, the communication in the present embodiment may be NFC (Near Field Communication), ZIGBEE, or the like. Alternatively, the communication may be performed according to an original communication method or load modulation.

The power transmission apparatus 101 is not limited to an apparatus dedicated to power transmission, but the power transmission apparatus 101 may be other apparatuses such as a printer, a personal computer (PC), or the like.

The power reception apparatus 201 may be configured as follows. The power reception apparatus 201 includes a load 200, a constant voltage circuit 203, a rectification circuit 205, a first detection unit 206, a second detection unit 207, a control unit 208, a reception antenna 209, and a communication unit 210. The control unit 208 controls the power reception apparatus 201. The control unit 208 may be, as with the control unit 105, a CPU including a memory. The load 200 is a load unit that consumes power received by the power reception apparatus 201. The load 200 may be, for example, a motor. Note that the load 200 is not limited to the motor, but the load 200 may be other apparatuses whose consumption power varies. The load 200 operates with a constant voltage output from the constant voltage circuit 203. When the consumption power of the load 200 increases, a current flowing through the load 200 increases. On the other hand, in a case where the consumption power of the load 200 decreases, the current flowing into the load 200 decreases.

The reception antenna 209 is a reception antenna for receiving power wirelessly supplied from the power transmission apparatus 101. The rectification circuit 205 converts the AC power generated from the electromagnetic wave received via the reception antenna 209 to DC power and outputs the resultant DC power. The constant voltage circuit 203 converts the input voltage to a constant voltage and outputs the resultant constant voltage to the load 200.

The first detection unit 206 detects a voltage or a current on a supply line 204 (denoted by B in FIG. 1) for supplying the output from the rectification circuit 205 to the constant voltage circuit 203. The voltage or the current detected by the first detection unit 206 is read out by the control unit 208. The second detection unit 207 detects a current on a supply line 202 (denoted by C in FIG. 1) for supplying the output from the constant voltage circuit 203 to the load 200. The voltage or the current detected by the second detection unit 207 is read out by the control unit 208. The communication unit 210 communicates with the power transmission apparatus 101. The communication unit 210 includes a chip for controlling wireless communication according to BLE and an antenna for transmitting a signal.

The power reception apparatus 201 may be, for example, a digital camera, a portable telephone, or a similar apparatus. Note that the wireless power transmission system according to the present embodiment may be applied to a system in which wireless power transmission is performed within a single device. For example, the wireless power transmission system according to the present embodiment may be applied to in-device power transmission for supplying power to a moving part of an arm of a robot, in-device power transmission for supplying power to a moving part of a network camera, in-device power transmission for supplying power to a head unit of an ink-jet printer, or the like. Although in the present example, it is assumed that the wireless power transmission system includes one power transmission apparatus and one power reception apparatus, the wireless power transmission system may include a plurality of power transmission apparatuses and a plurality of power reception apparatuses.

The wireless power transmission system configured in the above-described manner operates as follows. In the following description of the operation according to the present embodiment, the operation is performed, by way of example, to detect a foreign object 401, which does not have a function of receiving power wirelessly supplied from the power transmission apparatus 101, that is, a foreign object which is not a target object to which power is to be supplied from the power transmission apparatus 101. The foreign object 401 is for example, a metal, a non-contact IC card, or the like.

FIG. 2 is a diagram illustrating a relationship between a change in consumption power of a load 200 and a change in current or voltage at points A, B, and C shown in FIG. 1. In FIG. 2, changes in current or voltage at points A, B, and C and a change in consumption power of the load 200 are represented using arrows. A first row in FIG. 2 shows a first pattern (pattern #1) where there is no change in current or voltage at points A, B, and C and in consumption power of the load 200. In the pattern #1, there is no change in voltage or current at points A, B, and C, which will occur in a case where there is a foreign object 401 in the power transmission service area and thus the foreign object 401 absorbs power. Therefore, when the pattern #1 is observed, it is possible to determine that there is no foreign object 401 in the power transmission service area.

A second row in FIG. 2 shows a second pattern (pattern #2) where when there is no foreign object 401 in the power transmission service area, an increase in consumption power of the load 200 occurs, and correspondingly changes occur in voltages at points A and B and current at point C. The increase in the consumption power of the load 200 causes an increase in power supplied to the power reception apparatus 201 from the power transmission apparatus 101. Therefore, when the power supplied to the power reception apparatus 201 from the power transmission apparatus 101 increases, the current at point A increases because a constant voltage is applied from the power control unit 102 to the power transmission unit 104 of the power transmission apparatus 101. Furthermore, the increase in the consumption power of the load 200 results in an increase in the current flowing into the load 200, and thus a reduction occurs in the voltage at point B, that is, the voltage applied to the constant voltage circuit. The voltage at point C is maintained constant by the constant voltage circuit 203, and thus the increase in the consumption power of the load 200 results in an increase in the current flowing through the load 200. A third row in FIG. 2 shows a third pattern (pattern #3) where when there is no foreign object 401 in the power transmission service area, a reduction in consumption power of the load 200 occurs, and correspondingly changes occur in voltages at points A and B and current at point C. The reduction in the consumption power of the load 200 causes a reduction in power supplied to the power reception apparatus 201 from the power transmission apparatus 101. Therefore, when the power supplied to the power reception apparatus 201 from the power transmission apparatus 101 decreases, the current at point A decreases because the constant voltage is applied from the power control unit 102 to the power transmission unit 104 of the power transmission apparatus 101. Furthermore, the reduction in the consumption power of the load 200 results in a reduction in the current flowing into the load 200, and thus an increase occurs in the voltage applied to the constant voltage circuit. The voltage at point C is maintained constant by the constant voltage circuit 203, and thus the reduction in the consumption power of the load 200 results in a reduction in the current flowing through the load 200.

A fourth row in FIG. 4 shows a fourth pattern (pattern #4) in which voltages at points A and B and current at point C change when no change occurs in the consumption power of the load 200 in a situation in which there is a foreign object 401 in the power transmission service area. When there exists a foreign object 401 in the power transmission service area, power is supplied to the foreign object 401, and thus an increase occurs in power output from the power transmission apparatus 101. When the power output from the power transmission apparatus 101 increases, the current at point A increases because the constant voltage is applied from the power control unit 102 to the power transmission unit 104 of the power transmission apparatus 101. Furthermore, when the foreign object 401 exists in the power transmission service area, power supplied to the foreign object 401 causes a reduction in the power received by the power reception apparatus 201, and thus a reduction occurs in the voltage at point B. Furthermore, because the voltage at point C is maintained constant by the constant voltage circuit 203 and there is no change in consumption power of the load 200, no change occurs in current at point C occurs.

As described above, in the pattern #4 shown in the fourth row in FIG. 2, compared with the pattern #1 shown in the first row in FIG. 2 in which there is no foreign object, a reduction in the voltage at point B occurs although there is no change in consumption power of the load 200. Therefore, the power reception apparatus 201 is capable of detecting the existence of the foreign object 401 based on the change in the voltage applied to the constant voltage circuit and the change in the consumption power of the load 200.

A fifth row in FIG. 2 shows a fifth pattern (pattern #5) in which when there exists a foreign object 401 in the power transmission service area, an increase in the consumption power of the load 200 occurs, and corresponding changes occur in the voltages at points A and B and the current at point C. When there exists the foreign object 401 in the power transmission service area, power is supplied to the foreign object 401. Furthermore, the increase in the consumption power of the load 200 causes an increase in power supplied to the power reception apparatus 201 from the power transmission apparatus 101. Thus, the existence of the foreign object 401 in the power transmission service area and the increase in the consumption power of the load 200 cause an increase in the power output from the power transmission apparatus 101, and thus an increase in the current at point A occurs. Because the increase in the current at point A is caused by two factors, that is, the increase in the current due to the existence of the foreign object 401 and the increase in the current due to the increase in the consumption power of the load 200, the increase in the current at point A is abrupt and large.

Furthermore, when the foreign object 401 exists in the power transmission service area, power supplied to the foreign object 401 causes a reduction in the power received by the power reception apparatus 201. Furthermore, the increase in the consumption power of the load 200 results in an increase in the current flowing into the load 200, and thus a reduction occurs in the voltage at point B, that is, the voltage applied to the constant voltage circuit 203. Because the reduction in the voltage at point B is caused by two factors, that is, the reduction in the voltage due to the existence of the foreign object 401 and the reduction in the voltage due to the increase in the consumption power of the load 200, the reduction in the voltage at point B is abrupt and large. The voltage at point C is maintained constant by the constant voltage circuit 203, and thus the increase in the consumption power of the load 200 results in an increase in the current flowing through the load 200.

As described above, in the pattern #5 shown in the fifth row in FIG. 2, the change in the voltage at point B is large when the reduction occurs compared with the pattern #2 shown in the second row in FIG. 2 in which there is no foreign object as shown in the second row in FIG. 2. Therefore, the power reception apparatus 201 is capable of detecting the existence of the foreign object 401 based on the change in the voltage applied to the constant voltage circuit 203 and the change in the consumption power of the load 200.

A sixth row in FIG. 2 shows a sixth pattern (pattern #6) in which when there exists a foreign object 401 in the power transmission service area, a reduction in the consumption power of the load 200 occurs, and corresponding changes occur in the voltages at points A and B and the current at point C. When there exists a foreign object 401 in the power transmission service area, power is supplied to the foreign object 401. Furthermore, the reduction in the consumption power of the load 200 causes a reduction in power supplied to the power reception apparatus 201 from the power transmission apparatus 101. That is, at point A, an increase in current due to the existence of the foreign object 401 and the reduction in current due to the reduction in the consumption power of the load 200 occur, and thus a change in the current occurs depending on the difference between them.

For example, in a case where the reduction in the current due to the reduction in the consumption power is larger than the increase in the current due to the existence of the foreign object 401, the current at point A gradually decreases. On the other hand, in a case where the increase in the current due to the existence of the foreign object 401 is larger than the reduction in the current due to the reduction in the consumption power, the current at point A gradually increases.

Similarly, at point B, an increase in voltage due to the existence of the foreign object 401 and a reduction in voltage due to the reduction in the consumption power of the load 200 occur, and thus a change in the voltage occurs depending on the difference between them. As described above, in the pattern #6 shown in the sixth row in FIG. 2, there is a difference in the magnitude of the change in the current at point A and there is a difference in the magnitude of the change in the voltage at point B from those in the pattern #3 shown in the third row in FIG. 2 in which there is no foreign object. Therefore, the power reception apparatus 201 is capable of detecting the existence of the foreign object 401 based on the change in the voltage applied to the constant voltage circuit 203 and the change in the consumption power of the load 200.

Next, an operation of the power reception apparatus 201 according to the present embodiment is described below with reference to a flow chart shown in FIG. 3. The operation shown in the flow chart of FIG. 3 is realized by the control unit 208 by executing a control program stored in a memory to perform an operation on information, process information, and control various kinds of hardware. Part or all of the process shown in the flow chart of FIG. 3 may be realized, for example, by hardware such as an application specific integrated circuit (ASIC) or the like. The process shown in FIG. 3 is started when the power reception apparatus 201 is put into the power transmission service area covered by the power transmission apparatus 101. Note that it is assumed here that after the power of the power transmission apparatus 101 is turned on, the power transmission apparatus 101 intermittently generates a weak electromagnetic wave as power transmission for detecting the power reception apparatus 201.

When the operation starts, the power reception apparatus 201 determines whether power supplied by detection power transmission is detected (S301). In a case where the power reception apparatus 201 detects power of detection power transmission, the power reception apparatus 201 connects to the power transmission apparatus 101 via the communication unit 210 and performs an authentication process. The authentication process is a process for checking whether it is possible to perform wireless power transmission between the power transmission apparatus 101 and the power reception apparatus 201. In the authentication process, the power reception apparatus 201 and the power transmission apparatus 101 exchanges information about a wireless power transmission method supported by each apparatus. In a case where the wireless power transmission methods supported by the respective apparatuses are compatible, the authentication is successful, but otherwise the authentication fails. The power reception apparatus 201 determines, via the authentication process, whether to receive power supplied by the power transmission apparatus 101 (S303).

In a case where the authentication process in S303 fails and thus the power reception is not performed, the processing flow returns to S301. Alternatively, in the case where the authentication process in S303 fails, an error message may be displayed and the process may be ended. On the other hand, in a case where the authentication process in S303 is successful, and it is determined to perform power reception, the power reception apparatus 201 starts power reception (S304). The power reception apparatus 201 supplies the received power to the load 200 to allow the load 200 to operate.

When the power reception apparatus 201 starts power reception, the power reception apparatus 201 detects a current at point C using the second detection unit 206 and acquires consumption power of the load 200 based on the current at point C (S305). Furthermore, the power reception apparatus 201 detects a voltage at point B using the first detection unit 206 (S306). Note that the detection in S305 and the detection in S306 are performed substantially simultaneously. The power reception apparatus 201 determines whether a change has occurred in the current at point C, that is, the consumption power of the load 200. Furthermore, the power reception apparatus 201 determines whether a change has occurred in the voltage at point B (S307). The power reception apparatus 201 also detects the magnitude of the change in the consumption power of the load 200. The power reception apparatus 201 also detects the magnitude of the change in the voltage at point B.

In a case where it is determined in S307 that a change has occurred in the consumption power of the load 200 or the voltage at point B, the power reception apparatus 201 executes a foreign object check process to determine whether there exists a foreign object (S308). In the foreign object check process, a determination is performed as to which one of the patterns #1 to #6 represented in first to sixth rows in FIG. 3 best fits a relationship between the change in the current at point C and the change in the voltage at point B. It is assumed here that the power reception apparatus 201 has stored in advance in a memory a table representing the patterns #1 to #6 in terms of relative changes between the current at point C and the voltage at point B, such as those represented in the first to sixth rows in FIG. 3, for use in determining which one of the patterns #1 to #6 best fits the observed changes in the foreign object check process. That is, the power reception apparatus 201 detects the existence of a foreign object based on the change in the voltage at point B obtained as a result of the detection by the first detection unit 206 and the change in the current at point C obtained as a result of the detection by the second detection unit 207.

Alternatively, the power reception apparatus 201 may store in advance a pattern of a change in the voltage at point B as a function of a change in current at point C which may occur when there is no foreign object in the power transmission service area. The power reception apparatus 201 compares the magnitude of the change in the voltage at point B relative to the magnitude of the change in the current at point C with the value detected in S307 in terms of the magnitude of the change in the voltage at point B relative to the magnitude of the change in the current at point C. In a case where the detected difference is smaller than a predetermined threshold value, the power reception apparatus 201 may determine that there is no foreign object. However, in a case where the detected difference is equal to or larger than the predetermined threshold value, the power reception apparatus 201 may determine that there is a foreign object.

According to the result of the foreign object check process in S308, the power reception apparatus 201 determines whether there is a foreign object in the power transmission service area (S309). In a case where it is determined in the foreign object check process that the relationship between the change in the current at point C and the change in the voltage at point B fits one of the patterns #1 to #3 shown in FIG. 3, the power reception apparatus 201 determines that there is no foreign object in the power transmission service area. On the other hand, in a case where it is determined in the foreign object check process that the relationship between the change in the current at point C and the change in the voltage at point B fits one of the patterns #4 to #6 shown in FIG. 3, the power reception apparatus 201 determines that there is a foreign object in the power transmission service area.

In a case where it is determined in S309 that there is a foreign object in the power transmission service area, the power reception apparatus 201 transmits via the communication unit 210 a foreign object detection notification to the power transmission apparatus 101 to notify that there is a foreign object in the power transmission service area (S310). In response to receiving the foreign object detection notification, the power transmission apparatus 101 stops power transmission. After the power reception apparatus 201 transmits the foreign object detection notification, the power reception apparatus 201 stops power reception (S313), and the process is ended. Note that when the power reception apparatus 201 transmits the foreign object detection notification, the power reception apparatus 201 may perform an error handling process including displaying information indicating that there is a foreign object in the power transmission service area or/and information prompting the foreign object to be removed. When the power transmission apparatus 101 receives the foreign object detection notification, the power transmission apparatus 101 may display information indicating that there is a foreign object in the power transmission service area or/and information prompting the foreign object to be removed or moved.

On the other hand, in a case where it is determined in S309 that there is no foreign object in the power transmission service area, the power reception apparatus 201 determines whether to end the power reception (S311). In the determination in S311, for example, in a case where the operation of the load 200 is ended or in a case where a power reception error occurs, it is determined that the power reception is to be ended. In a case where the power reception is to be ended, the power reception apparatus 201 transmits via the communication unit 210 a power transmission stop request to the power transmission apparatus 101 (S312), and the power reception apparatus 201 ends the power reception (S313), and the process is ended.

According to the present embodiment, as described above, it is possible to detect a foreign object which does not have the function of receiving power, even in a situation in which a change occurs in consumption power of a load consuming received power.

Other Embodiments

In the embodiments described above, wireless power transmission is performed when the power reception apparatus is put on the power transmission apparatus. However, wireless power transmission may be performed also in a case where there is a spatial gap between the power reception apparatus and the power transmission apparatus. For example, the present embodiment may be applied to a case in which the power reception apparatus is an electric vehicle and the power transmission apparatus is installed on a floor or a road surface, and wireless power transmission is performed in a situation in which the power reception apparatus is not in contact with the power transmission apparatus.

In the embodiments described above, the power reception apparatus 201 performs the foreign object check process. Alternatively, the power transmission apparatus 101 may perform the foreign object check process. In this case, the power transmission apparatus 101 may receive via the communication unit 106 information indicating the voltage at point B and the current at point C from the power reception apparatus 201 and may perform the foreign object check process based on the received information.

In the case where the power transmission apparatus 101 receives the foreign object detection notification, the power transmission apparatus 101 may not stop the power transmission immediately but may stop the power transmission after a predetermined time period has elapsed. For example, in a case where the system shown in FIG. 1 is applied to a robot arm, the power transmission may be stopped after the robot arm returns to its home position.

The power reception apparatus 201 may receive information indicating the current or the voltage at point A related to the transmission power from the power transmission apparatus 101, and the power reception apparatus 201 may execute the foreign object check process based on the received information. This makes it possible to accurately perform the foreign object detection. In the embodiments described above, the foreign object detection is performed based on the voltage at point B. Alternatively, the foreign object detection may be performed based on the current at point B or power.

Each embodiment described above may also be realized by providing a program for realizing one or more functions of the embodiment to a system or an apparatus via a network or a storage medium, and reading out and executing the program by one or more processors in a computer disposed in the system or the apparatus. Each embodiment described above may also be realized using a circuit (for example, an ASIC) for realizing one or more functions of the embodiment.

According to the embodiments described above, it is possible to determine whether there is an object, which does not have the function of receiving power, in the power transmission service area even in a situation in which a change occurs in consumption power of a load consuming received power.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2015-148143, filed Jul. 27, 2015, which is hereby incorporated by reference herein in its entirety.

What is claimed is:

1. A power reception apparatus comprising:
   a power reception unit configured to receive power wirelessly supplied from a power transmission apparatus;
   a voltage conversion unit configured to convert a voltage of the power received by the power reception unit to a voltage with a particular value;
   a first detection unit configured to detect a change in voltage or current input to the voltage conversion unit;
   a second detection unit configured to detect a change in consumption power of a load unit that operates with power output from the voltage conversion unit; and
   a determination unit configured to make a determination, based on a relationship between the change in voltage or current detected by the first detection unit and the change in consumption power detected by the second detection unit, as to whether an object, which is not a target object to which power is to be transmitted, exists in a power transmission area covered by the power transmission apparatus.

2. The power reception apparatus according to claim 1, further comprising a notification unit configured, in a case where the determination unit determines that the object exists in the power transmission area, to notify that the object exists in the power transmission area.

3. The power reception apparatus according to claim 1, further comprising an execution unit configured, in a case where the determination unit determines that the object exists in the power transmission area, to execute a particular handling process.

4. The power reception apparatus according to claim 3, wherein the execution unit is configured to execute a process, as the particular handling process, to display information indicating that the object exists in the power transmission area or information to prompt the object to be removed.

5. The power reception apparatus according to claim 1,
   wherein the determination unit is configured to determine whether the object exists, based on a comparison between a relationship between a change in voltage or current input to the voltage conversion unit and a change in consumption power of the load unit in a case where the object does not exist in the power transmission area and the relationship between the change in voltage or current detected by the first detection unit and the change in consumption power detected by the second detection unit.

6. The power reception apparatus according to claim 5, further comprising a storage unit configured to store information relating to the relationship between the change in voltage or current input to the voltage conversion unit and the change in consumption power of the load unit in a case where the object, which is not a target object to which power is to be transmitted, does not exist in the power transmission area.

7. The power reception apparatus according to claim 5,
   wherein the first detection unit detects a change in voltage input to the voltage conversion unit, and
   wherein a relationship between the change in voltage input to the voltage conversion unit and the change in consumption power of the load unit in the case where the object does not exist in the power transmission area of the power transmission apparatus is a relationship in which the voltage input to the voltage conversion unit decreases in a case where the consumption power of the load unit increases and the voltage input to the voltage conversion unit increases in a case where the consumption power of the load unit decreases.

8. The power reception apparatus according to claim 5,
   wherein the first detection unit detects a change in voltage input to the voltage conversion unit, and
   wherein the determination unit determines that the object exists in the power transmission area of the power transmission apparatus in a case where a relationship between the change in voltage detected by the first detection unit and the change in consumption power detected by the second detection unit is different from a relationship between the change in voltage input to the voltage conversion unit and the change in consumption power of the load unit in the case where the object does not exist in the power transmission area of the power transmission apparatus.

9. The power reception apparatus according to claim 5,
   wherein the first detection unit detects an amount of change in voltage input to the voltage conversion unit,
   wherein the second detection unit detects an amount of change in consumption power of the load unit,
   wherein a relationship between the change in voltage detected by the first detection unit and the change in consumption power detected by the second detection unit is a relationship between the amount of change in voltage input to the voltage conversion unit detected by the first detection unit and the amount of change in consumption power of the load unit detected by the second detection unit, and wherein a relationship between the change in voltage input to the voltage conversion unit and the change in consumption power of the load unit in the case where the object does not exist in the power transmission area of the power transmission apparatus is a relationship between the amount of change in voltage input to the voltage conversion unit and the amount of change in consumption power of the load unit in the case where the object does not exist in the power transmission area of the power transmission apparatus.

10. The power reception apparatus according to claim 9, wherein the determination unit determines that the object exists in the power transmission area of the power transmission apparatus in a case where the relationship between the amount of change in voltage detected by the first detection unit and the amount of change in consumption power detected by the second detection unit is different from the relationship between the amount of change in voltage input to the voltage conversion unit and the amount of change in consumption power of the load unit in the case where the object does not exist in the power transmission area of the power transmission apparatus.

11. The power reception apparatus according to claim 10, wherein the determination unit determines that the object exists in the power transmission area of the power transmission apparatus in a case where an amount of increase in consumption power of the load unit in the case where the object does not exist in the power transmission area of the power transmission area and an amount of increase in consumption power detected by the second detection unit are the same and an amount of decrease in voltage detected by the first detection unit is larger than an amount of decrease in voltage input to the voltage conversion unit in the case where the object does not exist in the power transmission area of the power transmission area.

12. The power reception apparatus according to claim 10, wherein the determination unit determines that the object exists in the power transmission area of the power transmission apparatus in a case where an amount of decrease in consumption power of the load unit in the case where the object does not exist in the power transmission area of the power transmission area and an amount of decrease in consumption power detected by the second detection unit are the same, and where the change in voltage is not detected by the first detection unit, the change in voltage detected by the first detection unit indicates decrease, or an amount of increase in voltage detected by the first detection unit is smaller than an amount of increase in voltage input to the voltage conversion unit in the case where the object does not exist in the power transmission area of the power transmission area.

13. The power reception apparatus according to claim 5, wherein the first detection unit detects a change in current input to the voltage conversion unit, and wherein the determination unit determines that the object exists in the power transmission area of the power transmission apparatus in a case where a relationship between the change in current detected by the first detection unit and the change in consumption power detected by the second detection unit is different from a relationship between the change in current input to the voltage conversion unit and the change in consumption power of the load unit in the case where the object does not exist in the power transmission area of the power transmission apparatus.

14. The power reception apparatus according to claim 5, wherein the first detection unit detects an amount of change in current input to the voltage conversion unit, wherein the second detection unit detects an amount of change in consumption power of the load unit, wherein a relationship between the change in current detected by the first detection unit and the change in consumption power detected by the second detection unit is a relationship between the amount of change in current input to the voltage conversion unit detected by the first detection unit and the amount of change in consumption power of the load unit detected by the second detection unit, and wherein a relationship between the change in current input to the voltage conversion unit and the change in consumption power of the load unit in the case where the object does not exist in the power transmission area of the power transmission apparatus is a relationship between the amount of change in current input to the voltage conversion unit and the amount of change in consumption power of the load unit in the case where the object does not exist in the power transmission area of the power transmission apparatus.

15. The power reception apparatus according to claim 14, wherein the determination unit determines that the object exists in the power transmission area of the power transmission apparatus in a case where the relationship between the amount of change in current detected by the first detection unit and the amount of change in consumption power detected by the second detection unit is different from the relationship between the amount of change in current input to the voltage conversion unit and the amount of change in consumption power of the load unit in the case where the object does not exist in the power transmission area of the power transmission apparatus.

16. The power reception apparatus according to claim 1, further comprising an information reception unit configured to receive information in terms of transmission power from the power transmission apparatus, wherein the determination unit is configured to determine whether the object exists based on the information received via the information reception unit.

17. A determination method comprising:

performing a first detection process to detect a change in voltage or current input to a voltage conversion unit included in a power reception apparatus and configured to convert a voltage of power wirelessly supplied from a power transmission apparatus and received by the power reception apparatus to a voltage with a particular value;

performing a second detection process to detect consumption power of a load unit that operates with power output from the voltage conversion unit; and making a determination, based on a relationship between the change in voltage or current detected in the first detection process and the change in consumption power detected in the second detection process, as to whether an object, which is not a target object to which power is to be transmitted, exists in a power transmission area covered by the power transmission apparatus.

18. A storage medium storing a program for causing a computer to execute a determination method, the method comprising:

performing a first detection process to detect a change in voltage or current input to a voltage conversion unit included in a power reception apparatus and configured to convert a voltage of power wirelessly supplied from a power transmission apparatus and received by the power reception apparatus to a voltage with a particular value;

performing a second detection process to detect consumption power of a load unit that operates with power output from the voltage conversion unit; and making a determination, based on a relationship between the change in voltage or current detected in the first detection process and the change in consumption power detected in the second detection process, as to whether an object, which is not a target object to which power is to be transmitted, exists in a power transmission area covered by the power transmission apparatus.

* * * * *